Aug. 22, 1961 W. KLOSSIKA 2,996,801

METHOD OF FORMING AN HERMETIC SEAL

Filed Dec. 18, 1958 2 Sheets-Sheet 1

INVENTOR:
Walter Klossika

BY [signature]

PATENT AGENT

Aug. 22, 1961 W. KLOSSIKA 2,996,801

METHOD OF FORMING AN HERMETIC SEAL

Filed Dec. 18, 1958 2 Sheets-Sheet 2

INVENTOR:

Walter Klossika

BY [signature]

PATENT AGENT

United States Patent Office 2,996,801
Patented Aug. 22, 1961

2,996,801
METHOD OF FORMING AN HERMETIC SEAL
Walter Klossika, Ulm, Donau, Germany, assignor to Telefunken G.m.b.H., Berlin, Germany
Filed Dec. 18, 1958, Ser. No. 781,324
Claims priority, application Germany Dec. 19, 1957
3 Claims. (Cl. 29—525)

The present invention relates to a method of providing an hermetically sealed envelope of such type as will serve to house, for example, semi-conductor devices or transistors mounted on glass supports, said glass supports being fixed in a ferrule bordered by a flange-like enlargement.

In the manufacture of such semi-conductor devices, it is very important that these devices be sealed absolutely vacuum-tight, so that detrimental vapors, moisture and heat are excluded from access to the semi-conductor surface.

Surface transistors are very sensitive with respect to adsorption of gases and vapors on their surfaces. The use of plastic materials for the protection of semi-conductors has proven difficult since, unfortunately, no plastic material has been found which possesses the necessary sealing characteristics with respect to moisture. Due to constant switching on and off, the circuits of semi-conductors undergo sudden heating, followed by sudden cooling, whereby the plastic envelope is subjected to a constant deformation, i.e., expansion or shrinkage. Due to such deformation, microscopically small cracks or fissures occur in the plastic through which water vapors and air can enter the interior. In addition, the purity of the said plastic does not meet the necessary requirements. Therefore, glass and metal have predominantly been used as materials for the manufacture of such protective envelopes.

Generally, this envelope comprises two parts, i.e., a semi-conductor support for mounting the semi-conductor material and a shell. Several methods have already been known according to which a rigid bond between the semi-conductor support and the shell can be obtained. When metal is used as the material for the envelope, soldering steps are necessary, while the glass requires fusing steps. Such operations require brief but high temperature heat application. In case of small dimensions, application of undesirably high temperatures may result in thermal effects causing alteration of the semi-conductor characteristics.

In the manufacture of smaller types of semi-conductors, particularly, of sub-miniature types, the use of glass has become undesirable in view of the very small dimensions of these semi-conductors and the closeness to the semi-conductor body of the source of heat used for fusing of the glass. The envelopes of sub-miniature types are exclusively made of metal. In these cases, it is also recommended not to use closures requiring soldering, because, in addition to thermal effects, vapors from the flux may enter the interior of the envelope and may contaminate the surface of the semi-conductor bodies.

A method has already been proposed in which sealing of the envelope is accomplished without soldering. FIGURE 1 is a sectional view, illustrating the forming of a seal according to this method, wherein a semi-conductor support having a glass body 5 surrounded by a cylindrical metal ferrule 1 having an annular flange 2, is pressed into a cylindrical shell 3 to form the semi-conductor unit. An annular flange 2 serves as an abutment for the lower shell rim. The inner diameter $d_2$ of the metal shell has to be slightly smaller than the outer diameter $d_1$ of the metal ferrule 1 if a press-fit is desired. Pressing is only possible if the cylindrical jacket of the metal ferrule 1 on its upper rim has a bevel 4.

This pressing method has the following additional function:

A thin layer of ductile material, as for instance, tin, is applied to the outer cylindrical wall of the metal ferrule 1 prior to the pressing step. Due to the compression taking place between the outer cylindrical wall of the metal ferrule 1 and the inner wall of the shell 3, the ductile material will melt and bond to the two pressure surfaces, thereby sealing the joint.

This proposed method has the disadvantage that the transistors manufactured thereby and subjected to moisture tests actually are not sealed. The reason for this appears to be that the ductile material applied to the outer cylinder wall of the metal ferrule 1 is at least partially sheared off during the pressing of the ferrule 1 in the shell 3, as a result of the high compression forces.

It is an object of the present invention to avoid these disadvantages by placing a ring of suitably ductile material over a cylindrical metal ferrule provided with an annular flange on which this ring rests, whereupon the assembly, including the semi-conductor body plus the semi-conductor supporting ferrule, is pressed into a cylindrical shell which has formed on its inner periphery an annular cavity such that, during the pressing step, the ductile material of the sealing ring flows into the hollow space provided by the cavity in the periphery during the aforementioned forming step, and fills the latter.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 2:
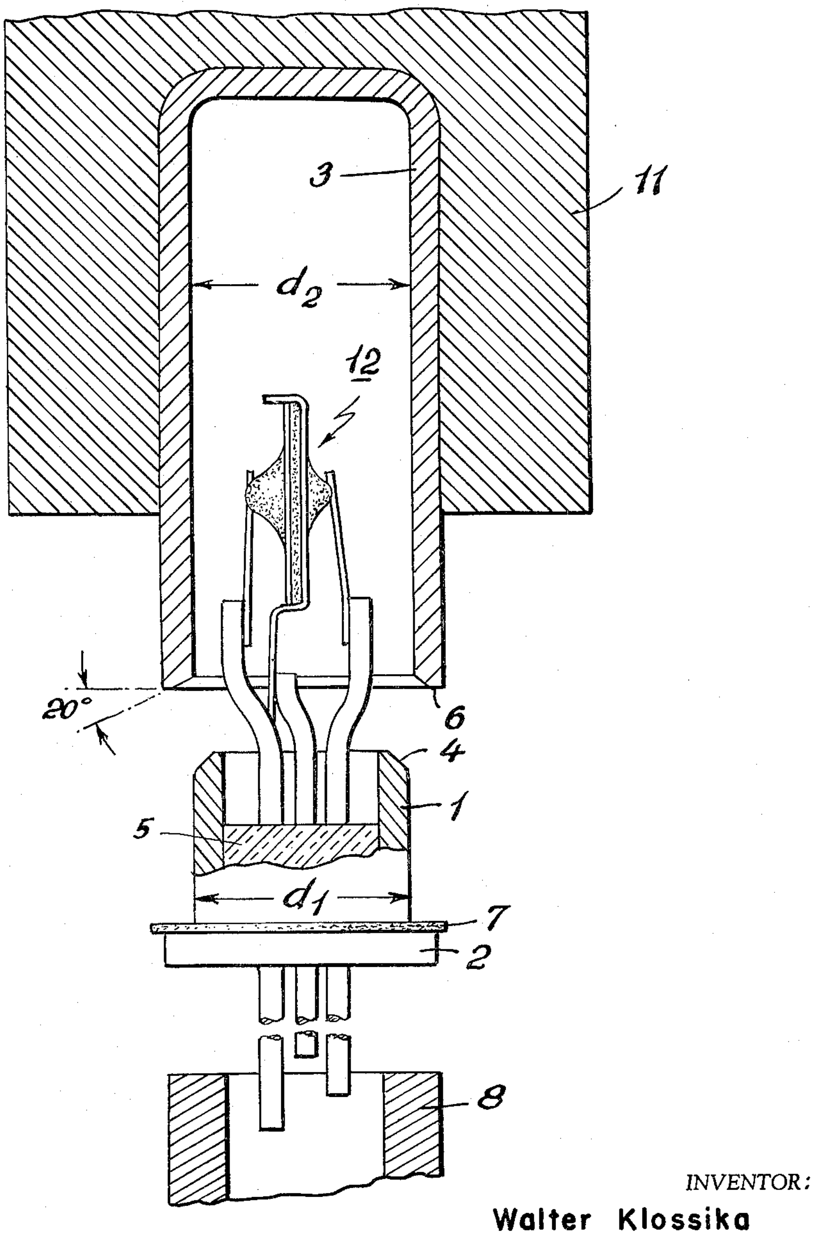
FIGURE 2 is a sectional view, illustrating the present method and showing the arrangement of parts prior to the pressing operation.

In the embodiment of the invention of FIGURE 2, a metal ferrule 1 with an annular flange 2 is illustrated. This metal ferrule 1 is opposite and adjacent to a cylindrical shell 3 held within a supporting socket 11, said shell 3 being made of nickel-silver or German silver and having a bevelled inner edge. In the embodiment of FIGURE 2, this bevel makes an angle of about 20° with the remaining surface 6 of the lower edge. The metal ferrule 1 has an outer diameter $d_1$ of 2.22 mm., while the inner diameter $d_2$ of the shell 3 is 2.17 mm. A lead ring 7 of 0.1 mm. thickness coated with a silicone lubricant is placed over the metal ferrule 1 and seated on flange 2, said metal ferrule 1 having a bevelled edge 4 at its upper end. An assembly 12 comprising a semi-conductor body and a semi-conductor support is then fixed in the metal ferrule 1, whereupon the latter is pressed into the shell 3 by moving a mandrel 8.

Figure 1:
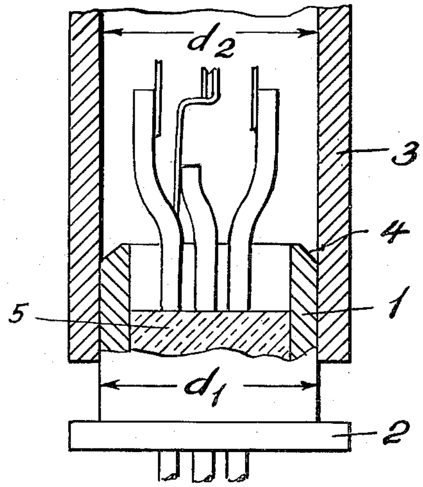
FIGURE 1 is a sectional view, illustrating a prior art method, as set forth above.
Figure 3:
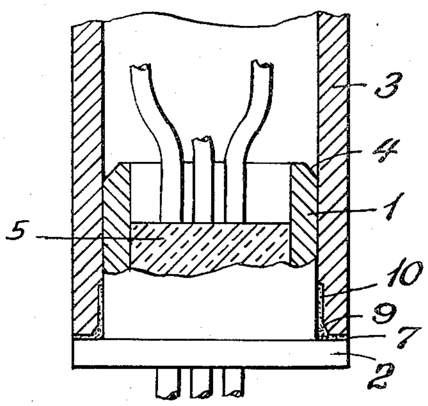
FIGURE 3 is an enlarged sectional view of the completed seal.

The silicone lubricant and the bevelled metal ferrule 1 facilitate the sliding of the parts to be joined. The portion of the lead ring 7, extending beyond the circumference of the flange 2, subsequently shears off. The advantage of the method according to the invention resides in that, according to FIGURE 3, the sealing material of the lead ring 7 is pressed into the cavity space 9 obtained by the compression forces according to the invention. Tests have proven that lead will enter, in addition to the cavity 9, a portion 10 of the sealing zone between the inner wall of the shell 3 and the outer wall of the metal ferrule 1. This desired action is in contrast to the known method, during which the ductile material which, prior to application of the compressional forces, is in the zone 10 will be sheared off by these compressional forces.

Since, according to the invention, the ductile material provided as a sealing medium does not tend to be squeezed out from the sealing zone between the metal ferrule 1 and the shell 3 during the compression step, the disadvantages of the known method are avoided, i.e., formation of channels in the sealing zone resulting in presence of moisture in the interior of the envelope.

I claim:

1. The method of heatlessly hermetically sealing the cylindrical portion of an envelop to a cylindrical metal ferrule of slightly greater diameter having an annular flange extending outwardly at about 90° comprising the steps of placing a ring of ductile material over said metal ferrule against said annular flange; internally beveling the outer end of the envelop to increase its inner diameter near the outer end; and then press-fitting the ferrule into the outer end beyond the internal bevel while flowing the sealing ring into the cavity between the internal bevel and the ferrule to fill said cavity entirely.

2. Method according to claim 1, characterized in that said internal bevel of said envelop at its outer end makes an angle of 20° with respect to the remaining transverse annular surface of said envelop end.

3. Method according to claim 1, characterized in that lead is used as the ductile material for said ring.

References Cited in the file of this patent

UNITED STATES PATENTS

| | | |
|---|---|---|
| 1,776,615 | Boothman et al. | Sept. 23, 1930 |
| 2,010,569 | Sitzler | Aug. 6, 1935 |
| 2,082,379 | Brittain | June 1, 1937 |
| 2,445,777 | Hahn | July 27, 1948 |
| 2,500,748 | Grant | Mar. 14, 1950 |
| 2,503,429 | Ziegler | Apr. 11, 1950 |
| 2,613,015 | Keating | Oct. 7, 1952 |